(12) United States Patent
Salehpour et al.

(10) Patent No.: US 10,876,022 B2
(45) Date of Patent: Dec. 29, 2020

(54) BIOPOLYMER AND ISOCYANATE BASED BINDER AND COMPOSITE MATERIALS

(71) Applicant: EcoSynthetix Inc., Burlington (CA)

(72) Inventors: Somaieh Salehpour, Burlington (CA); J. Douglas Ireland, Burlington (CA); Niels M. B. Smeets, Toronto (CA); Steven Bloembergen, Okemos, MI (US); Michael Kuska, Burlington (CA)

(73) Assignee: EcoSynthetix Inc., Burlington (CA)

( * ) Notice: Subject to any disclaimer, the term of this patent is extended or adjusted under 35 U.S.C. 154(b) by 0 days.

(21) Appl. No.: 15/637,694

(22) Filed: Jun. 29, 2017

(65) Prior Publication Data
US 2017/0298227 A1    Oct. 19, 2017

Related U.S. Application Data

(63) Continuation-in-part of application No. 15/537,531, filed as application No. PCT/CA2015/050371 on Apr. 30, 2015.
(Continued)

(51) Int. Cl.
*C09J 175/04* (2006.01)
*B27N 1/02* (2006.01)
(Continued)

(52) U.S. Cl.
CPC .............. *C09J 175/04* (2013.01); *B27N 1/02* (2013.01); *B27N 3/002* (2013.01); *C08G 18/302* (2013.01);
(Continued)

(58) Field of Classification Search
None
See application file for complete search history.

(56) References Cited

U.S. PATENT DOCUMENTS 3,879,212 A * 4/1975 Yoshida .................. C08K 5/05
106/162.1
4,801,631 A    1/1989 Sachs et al.
(Continued)

FOREIGN PATENT DOCUMENTS

CN       1957012 A     5/2007
CN     101362349 A     2/2009
(Continued)

OTHER PUBLICATIONS

Valodkar et al, isocyanate crosslinked reactive starch nanoparticles for thermo-responsive conducting applications, carbohydrate research, 345, pp. 2354-2360 (Year: 2010).*
(Continued)

*Primary Examiner* — Stefanie J Cohen (57) ABSTRACT

A binder has at least one isocyanate and at least one biopolymer mixed with water. The biopolymer may be a biopolymer nanoparticle or cooked and chemically modified starch. Optionally, the binder may also include urea. The biopolymer and water are mixed, and the isocyanate is added to the mixture. The binder may have a viscosity that is suitable for being sprayed on a substrate to make a composite material, for example a viscosity of 700 cP or less or 500 cP or less at 40° C. The substrate may be wood, another lignocellulosic material, or synthetic or natural fibers. In particular examples, the binder is used to make no added formaldehyde wood composites including particle board and fiberboard. Alternatively, the binder may have a higher viscosity and be used to make plywood.

11 Claims, 4 Drawing Sheets

Related U.S. Application Data (60) Provisional application No. 62/096,260, filed on Dec. 23, 2014.

(51) Int. Cl.

| | | |
|---|---|---|
| *C08L 3/02* | (2006.01) | |
| *C08L 97/02* | (2006.01) | |
| *C08G 18/64* | (2006.01) | |
| *B27N 3/00* | (2006.01) | |
| *C08J 3/24* | (2006.01) | |
| *C08K 5/29* | (2006.01) | |
| *C08G 18/70* | (2006.01) | |
| *C08G 18/76* | (2006.01) | |
| *C08G 18/30* | (2006.01) | |
| *C08L 75/04* | (2006.01) | |
| *B27N 3/04* | (2006.01) | |

(52) U.S. Cl.
CPC ..... *C08G 18/6484* (2013.01); *C08G 18/6492* (2013.01); *C08G 18/706* (2013.01); *C08G 18/7664* (2013.01); *C08J 3/24* (2013.01); *C08K 5/29* (2013.01); *C08L 3/02* (2013.01); *C08L 75/04* (2013.01); *C08L 97/02* (2013.01); *B27N 3/04* (2013.01); *C08J 2303/02* (2013.01)

(56) References Cited

U.S. PATENT DOCUMENTS

| | | | | |
|---|---|---|---|---|
| 4,849,262 | A | | 7/1989 | Uhl et al. |
| 4,944,823 | A | * | 7/1990 | Stofko ............... C08G 18/3218 106/207.1 |
| 5,190,818 | A | * | 3/1993 | Sakai ........................ C09J 7/38 428/355 CP |
| 5,503,668 | A | * | 4/1996 | Giesfeldt ............... C09J 103/00 106/217.7 |
| 6,017,998 | A | | 1/2000 | Duan et al. |
| 6,291,579 | B1 | | 9/2001 | Kalck et al. |
| 6,790,271 | B2 | * | 9/2004 | Thames ................. C08L 91/00 106/148.1 |
| 6,818,686 | B1 | | 11/2004 | Colpaert et al. |
| 9,562,177 | B2 | * | 2/2017 | Mann ..................... C09J 103/00 |
| 2003/0077444 | A1 | * | 4/2003 | Bond ....................... D01F 8/06 428/364 |
| 2004/0043043 | A1 | | 3/2004 | Schlyter et al. |
| 2005/0145829 | A1 | | 7/2005 | Leyrer et al. |
| 2006/0073334 | A1 | | 4/2006 | Schwantes et al. |
| 2007/0225442 | A1 | | 9/2007 | Ootuka et al. |
| 2007/0240823 | A1 | * | 10/2007 | Alevisopoulos ....... C09J 103/02 156/336 |
| 2008/0021187 | A1 | * | 1/2008 | Wescott ................. C09J 189/00 527/301 |
| 2009/0215954 | A1 | | 8/2009 | Gertzmann et al. |
| 2010/0251932 | A1 | * | 10/2010 | Sujeeth ................... A61K 8/445 106/31.13 |
| 2011/0027594 | A1 | | 2/2011 | Johnson et al. |
| 2012/0309246 | A1 | * | 12/2012 | Tseitlin ...................... C08J 5/24 442/180 |
| 2013/0161259 | A1 | | 6/2013 | Moliere |

FOREIGN PATENT DOCUMENTS

| | | |
|---|---|---|
| CN | 101524857 A | 9/2009 |
| CN | 102199410 A | 9/2011 |
| DE | 2336381 A1 | 2/1975 |
| EP | 0335342 A1 | 10/1989 |
| EP | 0464781 A1 | 1/1992 |
| JP | 2000-301503 | 10/2000 |

OTHER PUBLICATIONS

Chilean Patent Application No. 201701568, Office Action dated Aug. 8, 2018—English Translation Not Available.
European Patent Application No. 15871382.6, Extended European Search Report dated Aug. 14, 2018.
International Patent Application No. PCT/CA2015/050371, International Preliminary Report on Patentability dated Jul. 6, 2017.
International Patent Application No. PCT/CA2015/050371, International Search Report and Written Opinion dated Sep. 10, 2015.
Chinese Patent Application No. CN201580070432.2, Office Action dated Dec. 19, 2018—English Translation Available.
U.S. Appl. No. 15/537,531, Non-Final Office Action dated Feb. 28, 2019.
Whistler, "Solubility of Polysaccharides and Their Behavior in Solution," Advances in Chemistry, Chapter 14, 1973, pp. 242-255.
Canadian Patent Application No. 2,970,909 Office Action dated Dec. 27, 2018.
Canadian Patent Application No. 2,970,909 Office Action dated May 24, 2019.
Canadian Patent Application No. 2,970,909, Office Action dated Oct. 18, 2019.
Chinese Patent Application No. 201580070432.2, Second Office Action dated Sep. 2, 2019—English Translation Available.
European Patent Application No. 15871382.6, Office Action dated Sep. 19, 2019.
U.S. Appl. No. 15/537,531, Final Office Action dated Oct. 29, 2019.
Canadian Patent Application No. 2,970,909, Office Action dated Aug. 31, 2018.
European Patent Application No. 15871382.6, Office Action dated Feb. 19, 2020.
Chilean Patent Application No. 201701568, Office Action dated Jun. 10, 2019.
Brazilian Patent Application No. BR112017013548, Office Action dated Jan. 23, 2020.
Chinese Patent Application No. 201580070432.2, Office Action dated Mar. 3, 2020—English Translation Available.
Maningat and Seib., "Understanding the Physicochemical and Functional Properties of Wheat Starch in Various Foods", Cereal Chemistry, Jul. 2010, vol. 87(4), pp. 305-314.
U.S. Appl. No. 15/537,531, Non-Final Office Action dated Mar. 11, 2020.
Chinese Patent Application No. 201580070432.2, Office Action dated Aug. 19, 2020—English Translation Available.
U.S. Appl. No. 15/537,531, Non-Final Office Action dated Aug. 17, 2020.
Wang et al., "Study on Molecular Weight Distribution of Starch of Different Varieties," Journal of South China University of Technology, vol. 25(7), pp. 30-34.

* cited by examiner

BIOPOLYMER AND ISOCYANATE BASED BINDER AND COMPOSITE MATERIALS

RELATED APPLICATIONS

This patent is a continuation-in-part of U.S. application Ser. No. 15/537,531, filed on Jun. 19, 2017, which is a national stage entry of International Application Number PCT/CA2015/050371, filed on Apr. 30, 2015, which claims the benefit of U.S. provisional application 62/096,260, filed on Dec. 23, 2014, all of which are incorporated herein by reference.

FIELD

This specification relates to binders or thermosetting resins and to composite materials including a binder and wood, other lignocellulosic materials, or synthetic or natural fibers.

BACKGROUND

Composite wood products include, for example, particle board, medium density fiberboard, oriented strand board (OSB), plywood and laminated veneer lumber (LVL). Many composite wood products are conventionally made with formaldehyde-based resins. However, concerns over excess formaldehyde emissions have encouraged the creation of "no added formaldehyde" (NAF) resins. Replacement resins should meet relevant performance requirements for the end product, such as bonding strength and water resistance. However, replacement resins must also meet various requirements of the manufacturing process.

Isocyanate binders, such as polymeric methylene diphenyl diisocyanate (pMDI), have been used to make NAF wood composites such as particle board or MDF. pMDI is used to make these products because, among other attributes, it has a low viscosity (less than 500 cPs at 40° C.) suitable for spraying on sawdust or wood chips in blow lines or resonators resulting in finished boards with good water tolerance and mechanical properties. However, pMDI has some disadvantages. For example, pMDI can be absorbed by wood resulting in starved glue lines, so it does not always produce an effective bond at the surface of the wood particle unless applied in an amount sufficient to provide good coverage despite the adsorption. Since pMDI is not miscible in water, it is typically used in a 100% active liquid and coverage cannot be increased without increasing the amount of pMDI used. Bond quality may also be reduced because isocyanate-based binders can start curing before the wood is pressed. Combining the amount of pMDI needed to overcome these difficulties with the unit volume price of the raw material results in pMDI based products being more expensive than formaldehyde based products. pMDI also tends to build up on metal surfaces such as in press plates and processing equipment requiring release agents and regular process cleanup resulting in machine downtime. Machining wood products made with pMDI has the potential to cause increased tool wear relative to products made with relatively soft urea-formaldehyde (UF) based resins. Despite these disadvantages, pMDI is still one of the leading binders used for making NAF particle board and MDF. The low viscosity of pMDI, while advantageous in sprayed applications, makes pMDI unsuitable for making other composites, such as plywood or veneer, where higher viscosity binders are used.

U.S. Pat. No. 4,801,631 describes an aqueous dispersion containing about 15 to 30% by weight of polyisocyanates, 10 to 15% cold water soluble starch and 14 to 25% of flour and the appropriate amount of water to add up to 100%. Exemplary dispersions had at least one hour of pot life and a viscosity of about 2000 centipoise (cP). The dispersions were spread on wood veneers and cured. Samples made without the flour had similar viscosity but a pot life of less than 30 minutes.

U.S. Pat. No. 4,944,823 relates primarily to water free compositions containing an isocyanate and sugar or starch. However, in one example an aqueous composition was made by first blending 20% MDI with 80% industrial wheat flour for 5 minutes, letting the mixture react for 10 minutes, and then mixing 100 grams of the blend with 150 grams of water for 5 minutes. The resulting binder was spread on veneers to make plywood. This binder is described as a viscous mass with a relatively short shelf life.

INTRODUCTION

The following introduction is intended to introduce the reader to the detailed description to follow, and not to limit or define any claimed invention.

There has been a need in the art for no added formaldehyde binders, and a specific need for a means of extending or dispersing an isocyanate binder, for many years. The '631 and '823 patents, for example, were issued in 1989 and 1990 respectively. More recently, some modified isocyanates (called EMDI) have been developed that form emulsions in water. These products help with the coverage issue described above, but only by using a product that is even more expensive than pMDI and still made from petroleum. Efforts to mix pMDI with bio-based materials have not yet, to the knowledge of the inventors, been commercialized. The two patents described above suggest that biopolymer and pMDI based binders are prone to having high viscosity and short pot life, which would prevent them from being used in industrial scale equipment for making common wood composites such as particle board and MDF. In this specification, the inventors describe biopolymer and isocyanate mixtures that have low and stable viscosity, and also sufficient strength and water resistance to provide alternative no added formaldehyde binders. Without intending to be bound by theory, these properties are believed to result from forming an emulsion of small oil-phase droplets comprising one or more isocyanates in water stabilized by a biopolymer shell, while limiting the viscosity contributed by biopolymer in the continuous phase of the emulsion. Preferably, the shell comprises starch. The emulsion can be produced by a) mixing of water and biopolymer followed by addition of isocyanate, c) mixing of water and biopolymer followed by addition of isocyanate and dilution with more water either while or after adding the isocyanate. Surprisingly, even though isocyanates are generally immiscible in water, the most stable low viscosity emulsions are produced when the oil phase containing one or more isocyanates is mixed into a pre-made mixture of biopolymer and only a limited amount of water, followed by dilution. An emulsion may be sprayed on wood based substrates such as wood fines, fibers or chips. Alternatively, a) a mixture of water and biopolymer and b) one or more isocyanates, can be sprayed on the substrates separately, either at the same time or with the one or more isocyanates applied later. The substrate, water, biopolymer and isocyanate mixture is then cured to form a composite wood product.

This specification describes a binder having one or more isocyanates, one or more biopolymers and water. The preferred biopolymer is a starch nanoparticle or a low molecular weight starch. The mass of isocyanate is preferably between 50% and 150% of the mass of water. Optionally, the binder may also include urea.

In a process described in this specification, one or more biopolymers are mixed with water, and then one or more isocyanates are added to the mixture. The one or more biopolymers can be dispersed or dissolved in the water. Optionally, more water may be added to dilute the resulting emulsion, either after or while adding the one or more isocyanates. The mixtures can be made at one site, and optionally in a continuous process with the mixture of the one or more biopolymers and water being made upstream of where the one or more isocyanates and any additional water are mixed in. Alternatively, the mixture of the one or more biopolymers and water can be pre-made in a separate process, optionally remotely. In some cases, the mixture of the one or more biopolymers and water might be a commercially available product such as a syrup or a biopolymer nanoparticle dispersion.

An emulsion described in this specification comprises a plurality of isocyanate droplets, each surrounded by a starch shell. The isocyanate droplets preferably have an average size from 10 to 500 microns. Optionally, the emulsion may further comprise starch in solution or starch hydrogel particles.

A binder as described herein may have a viscosity that is suitable for being applied as droplets, for example sprayed, on a loose particulate substrate to make composite materials such as particle board and fiberboard (i.e. MDF or other grades of fiberboard), for example a viscosity of 700 cPs or less at 40° C. The binder may also be used to make other wood composites, or composites of other lignocellulosic materials, or synthetic or natural fibers. Alternatively, a binder as described herein may be formulated with a higher viscosity, for example 1000 cP or more and applied as a bulk liquid, for example by roller or coater, onto sheet materials such as wood veneer to make composite materials such as plywood. Similarly, a binder as described herein may be used to make other wood composite materials such as oriented strand board, laminated veneer lumber, finger jointed lumber, parallel strand lumber, glue laminated timber, or cross laminated timber.

DETAILED DESCRIPTION

Isocyanates useful as binders include, without limitation, toluene diisocyanate (TDI), hexamethylene diisocyanate (HDI), methylene diphenyl diisocyanate (MDI) and polymeric MDI (pMDI). Polymeric MDI typically is a mixture of MDI, containing about 30 to 80% w/w 4,4'-methylene diphenyl isocyanate, with the remainder of the mixture comprised of higher molecular weight MDI oligomers and polymers. Isocyanates are generally not miscible in water although some emulsifiable MDI formulations (EMDI) are commercially available and may be used as binders.

Biopolymers useful as binders include, for example, carbohydrates, preferably starch. Binders may be made with starch in various modified forms, such as regenerated starch particles, chemically modified starch (i.e. hydrolyzed starch) or thermally modified starch (i.e. dextrinized starch). Chemically or thermally modified starches that can be used as binders without cooking are often referred to commercially as cold soluble starches. Regenerated starch is starch that has been converted to a thermoplastic melt phase (its native crystalline structure has been essentially removed) and then reconfigured into a particle, for example by cross-linking. Regenerated starch of an appropriate particle size is an example of a biopolymer nanoparticle starch. They are readily water-dispersible and do not require cooking. Preferred starches have at least a portion of the starch with a molecular weight of 1,000,000 Da or less. More preferred starches have a molecular weight of less 100,000 Da or have been regenerated into nanoparticles.

The manufacture of biopolymer nanoparticles is described, for example, in International Publication Number WO 00/69916 and International Publication Number WO 2008/022127. Other methods are known in the art for making biopolymer nanoparticles. Even though the term "nanoparticle" usually refers to particles 100 nm and smaller, in this specification it is used to refer to particles that have an average particle size of about 1000 nm or less or that form a colloid in water.

In principle, any biopolymer, or mixture of two or more biopolymers, may be used to make biopolymer nanoparticles. In particular, any starch, for example waxy or dent corn starch, potato starch, tapioca starch, dextrin, dextran, starch ester, starch ether, hydroxyethylated or hydroxypropylated starch, carboxymethyl starch (CMS), cationic or anionic starch, and mixtures thereof, may be used. In an exemplary method, the biopolymer is heated and mechanically processed with water, optionally a plasticizer, optionally a crosslinker, and optionally other additives. The heating and mechanical processing may occur in an extruder, preferably a co-rotating twin screw extruder. The biopolymer, water and any plasticizer are preferably added to the feed zone of an extruder. The plasticizer may be a polyol such as glycerol. The crosslinker may be a reversible crosslinker. In an intermediate or gelatinization zone of the extruder, located downstream of the feed zone, the temperature is maintained between 60 and 200 degrees C., or between 100 and 140 degrees C. At least 100 J/g, or at least 250 J/g, of specific mechanical energy per gram of the biopolymer is applied in the intermediate zone. The pressure in the intermediate zone may be between 5 and 150 bar. A crosslinker, if any, may be added in a reaction zone that follows, or overlaps with the end of the intermediate zone.

When the biopolymer is starch, the starch is substantially gelatinized (converted into a thermoplastic melt phase) in the intermediate zone. Starch nanoparticles primarily form hydrogel particles when dispersed although some of the starch may dissolve. The starch in at least a portion of the nanoparticle may have a molecular weight between about 700,000 and 800,000 Da.

A biopolymer based binder may have various secondary components. Examples of secondary components include urea, melamine and citric acid, and/or another nitrogen heterocycle. Urea is a crosslinker but also scavenges formaldehyde. Melamine can make biopolymers less hydrophilic. In the case of biopolymer nanoparticles, one or more secondary components may optionally be added during the nanoparticle formation process. A biopolymer based binder is preferably made up of 50% or more, more preferably 80% or more, by weight of biopolymer before isocyanate is added.

To make composite materials, a binder is mixed with a substrate and cured. Curing is typically triggered by heat applied to the binder and substrate mixture. The binder and substrate are often compressed during curing. Alternatively, a two part binder is cured by mixing two parts of the binder together to initiate a curing reaction, and then mixing the binder with the substrate before the reaction is complete. These two methods may also be combined.

Composite material substrates include, for example, wood products and fibers. Wood products include veneer, wood chips, wood flour and sawdust. Fibers include, without limitation, natural (such as hemp, jute, and sisal), synthetic fibers (such as nylon, polyester and polypropylene) and mineral fibers (such as fiberglass and mineral wool). Composite wood products include, for example, particle board, medium density fiberboard (MDF), high density fiberboard (HDF), oriented strand board (OSB), plywood, laminated veneer lumber (LVL) and wood thermal insulation.

A binder useful in making composite materials, among other potential applications, has an isocyanate, a biopolymer and water. The biopolymer is preferably a starch based biopolymer nanoparticle, or a modified starch having a molecular weight of less than 1,000,000. It is preferable for the starch to not have a crystalline structure. For example, a modified (i.e. cold soluble) starch may be cooked or left in a dispersed state for a period of hours or days before isocyanate is added. It is predicted that cooking starch, chemically (optionally enzymatically) or thermally modified before or after cooking, to reduce its molecular weight and remove crystalline structures, may also be useful whether the starch is cold water soluble or not.

The mass of isocyanate is preferably not more than 150%, or not more than 130%, or not more than 110% of the mass of water in a binder when it is applied to wood. However, the mass of isocyanate may be more than 150% of the mass of water when the isocyanate is added to a biopolymer in water dispersion. The mass of isocyanate is preferably not less than 50% of the mass of water, at least when the isocyanate is added to a biopolymer in water dispersion. The binder may be diluted further after the isocyanate is added to a biopolymer in water dispersion. The mass of biopolymer is preferably not more than 55% of the mass of water. The combined mass of the isocyanate and biopolymer is preferably not more than 175% or 150% of the mass of water. The ratio of biopolymer to isocyanate may be between 80:20 and 15:85 while producing strength and water resistance properties comparable to products made with urea formaldehyde (UF) binder. Biopolymer to isocyanate ratios of 50:50 to 15:85 are preferred if the product is to have properties comparable to products made with a pMDI binder. Biopolymer to isocyanate ratios of 25:75 or more are more preferred. Optionally, the binder may also include urea.

In a process described in this specification, the biopolymer and water are mixed, and the isocyanate is added to the mixture. Preferably, the biopolymer and water form a stable dispersion before isocyanate is added. The isocyanate may be added to the biopolymer and water mixture with mixing by mechanical agitation and/or feeding both components into an in-line static mixer. The isocyanate and biopolymer in water preferably form a relatively stable emulsion. Mixing the isocyanate into a biopolymer in water dispersion enables the isocyanate to form an aqueous mixture, possibly an emulsion or other dispersion, wherein some of the biopolymer forms a shell around isocyanate droplets. The term "relatively stable" used above preferably indicates sufficient emulsion stability so as not to significantly build viscosity for an acceptable time at a specific temperature. In industry terms, the requirement in terms of stability is to ensure that there is sufficient process "pot life" for the aqueous isocyanate emulsion. For making particle board or fiberboard such as MDF, viscosity should be less than 700 cP at 40° C. for at least 15 minutes. However, a preferred binder has a viscosity of less than 500 cP, or more preferably less than 300 cP. A preferred binder remains with low viscosity for 30 minutes or more, preferably 60 minutes or more. Alternatively, for making plywood a viscosity of at least 1000 cP or more is preferred.

Simply mixing an oily isocyanate, such as MDI or pMDI, into water does not result in the formation of a stable mixture or emulsion, but quickly phase separates into separate oily and aqueous layers. Without intending to be limited by theory, the biopolymer component is believed to form a polymeric protective layer at the oil-water interface that results in enhanced emulsion stability (process pot life). Once this layer has formed, the emulsion may be diluted without loss of stability. Certain biopolymers such as starches and biopolymer nanoparticles are particularly suitable for producing a polymeric protective layer for enhanced emulsion stability. In the case of biopolymer nanoparticles, there may be an effect such as a Pickering stabilization. The binder is preferably relatively stable at room temperature, without excessive loss of short term NCO functionality. The isocyanate part of the binder is ultimately thermosetting. After heat curing, preferably under pressure, the binder has minimal water solubility.

A binder as described herein may be formulated with a viscosity that is suitable for being sprayed on a substrate to make a composite material, or otherwise applied as in a blow line or resinator to make particle board or MDF. When sprayed, or otherwise applied to wood while making particle board or MDF, a binder preferably has a viscosity of 700 cP or less, preferably 500 cP or less, at 40° C. For veneer based products, such as plywood and LVL, the viscosity is preferably in the range of about 1500-5000 cP. Viscosity is typically measured by Brookfield viscometer using spindle 5 and 200 or 100 rpm. Alternatively, viscosity can be measured by RVA at 100 rpm. Viscosity results determined by these two methods are generally comparable, although the viscosity measured by RVA may be lower. In cases where viscosity is measured at room temperature (15-25° C.), the viscosity at 40° C. is generally roughly about half, for example 40-60%, of the viscosity measured at room temperature.

The substrate may be wood, another lignocellulosic material, or synthetic or natural fibers. In particular examples, the binder is used to make wood composites including particle board and MDF. pMDI alone is typically sprayed on wood chips or sawdust at about 3 to 6 g pMDI per 100 g wood, the higher application rates being used for exterior grade products. The combined biopolymer-isocyanate binder may be, for example, applied at 5 to 12 g (including water) of binder per 100 g wood. The increased application rate allows for a better distribution of binder on the wood and may be compatible with equipment used for spraying formaldehyde based resins, which is typically applied at about 10 g urea formaldehyde (UF) per 100 g of wood. The combined weight of the biopolymer and isocyanate (without water) may be between 2% and 6% of the weight of the wood, preferably between 2% and 4% of the weight of the wood for interior grade products and between 4% and 6% for exterior grade products.

In general, hybrid binders as described herein have a biopolymer component and an isocyanate component. The biopolymer component may be proteinaceous, amylaceous or both. The biopolymer component is preferably made from at least 50% starch feedstock on a dry weight basis. Optionally, there may also be a second compound provided with the biopolymer component. The second compound may comprise a crosslinker and/or hydrophobizing agent, for example an amide or amine compound, such as urea, melamine and citric acid, and/or another nitrogen heterocycle, or other compound with amine functionality. Isocyanates useful as binders include, without limitation, TDI, HDI, MDI and pMDI. The preferred isocyanate compound may be, for example, pMDI. The components may be mixed together before being applied to the wood or other fibres to be bound, or the biopolymer component and second compound (if any) may be applied together while the isocyanate component is applied separately. Preferably, the binder is an aqueous composition. Without being limited by theory, aqueous binders having low viscosity are believed to be oil-in-water emulsions. However, hybrid binders as described herein may or may not be an emulsion or any other type of dispersion.

A preferred binder is made by first extruding starch, for example waxy corn starch or a mixture of different starches, for example 10-30% potato starch and 70-90% waxy corn starch, along with water and, preferably, a plasticizer and/or a crosslinker to form biopolymer nanoparticles. These nanoparticles are preferably dispersed in water with about 10-25 parts per 100 parts starch of a second compound such as urea. This dispersion may have a solids content of about 25 to 50%. The dispersion is then mixed in a ratio between about 80:20 and 15:85 with an isocyanate, for example pMDI or a mixture of pMDI with another isocyanate, on a solids (biopolymer and any urea) to solids (isocyanate) mass basis. The binder may be diluted by adding more water after the isocyanate is added. The resulting binder has a low viscosity suitable for being sprayed or otherwise applied on wood chips or mixed with wood fibers in a blow line or resonator used to make particle board or MDF.

The isocyanate binder is miscible in the biopolymer dispersion. This allows a lower amount of total isocyanate binder to be used with comparable performance in the finished composite product relative to using pMDI alone. Without intending to be limited by theory, the inventors also believe that the higher molecular weight of the biopolymer component (relative to pMDI) may assist in reducing absorption of the binder into the wood and thereby improve coverage or binding strength of the binder, or add a degree of plasticity to the binder which may thereby reduce wear in tools working on the finished product, or both. In tests, it was discovered that the hybrid binder did not accumulate on metal surfaces as much as pMDI alone and required less release agent in the press.

The second compound is not required for miscibility. However, the second compound may help reduce the viscosity of the dispersion and/or may improve one or more qualities of the finished product. Urea in particular also scavenges formaldehyde, which may be present in wood, particularly recycled wood. For applications such as plywood or veneer for which higher viscosity is required, the second compound can be either added or omitted, and the solids content of the dispersion increased to increase its viscosity.

Biopolymer nanoparticles may be made with single biopolymers or with blends of biopolymers. For example, commercial EcoSphere® 2202 nanoparticles available from EcoSynthetix and made from crosslinked waxy corn starch may be used. However, the addition of some potato starch in the nanoparticles provides improved water resistance in the finished product. Other amylaceous nanoparticles can also be used. Other forms of starch, such as cold soluble starches (e.g., dextrins or other chemically modified starches) or cooked chemically modified (e.g., hydroxyethylated, hydroxypropylated) starches may also be used, but are not preferred. In some trials, cold soluble starches were found to provide acceptable performance only after they were first cooked or left standing for long periods of time, although better performance might have been obtained if the phase ratio of pMDI:Water had been higher when the isocyanate was added, and/or of the emulsion had been diluted after the isocyanate was added. Further, the viscosity of cooked or cold soluble starch without pMDI may be acceptable for spraying, and results with nanoparticle starch applied separately from pMDI suggest that applying cooked starches generally (or thermoplastic melt phase starch produced otherwise) or cold water soluble starch separately from pMDI would produce an acceptable product. The preferred starch is, however, a biopolymer nanoparticle starch, which more easily and reliably produces stable binders. The second compound may be dispersed, dissolved or mixed in an aqueous solution or dispersion of the biopolymer. Alternatively, the second compound can be incorporated with the biopolymer by adding the second compound to an extruder (either before or after the reaction zone) used to make biopolymer nanoparticles. For example, waxy corn starch or a mixture of waxy corn starch and potato starch can be extruded with urea. A less hydrophilic nanoparticle may be made of waxy corn starch extruded with 10 parts melamine and 5 parts citric acid. Incorporating biopolymer nanoparticles with a second compound via extrusion may be useful, for example, to simplify mixing steps at the board manufacturing site.

Binders preferably remain stable at normal operating process conditions such as temperature and dwell time prior to curing, maintaining both their low viscosity and reactive groups. Typical operating temperatures range from about 40-75° C., at time periods ranging from about 15 minutes to about 1 hour or more. Binders that are stable for longer periods of time are generally easier to use in manufacturing. To make a wood composite, the biopolymer-isocyanate binder may be applied on wood chips, saw dust and/or fiber filaments which are at about 50-60 degrees C., maintained in an oven at about 70 degrees C. and then cured in a press at about 180 degrees C. Curing in the press may produce temperatures of 170-190° C. at the product surface but the temperature at the core of the product could be between 100 to 120° C. The binder is preferably able to cure at 110° C. or less but withstand 190° C. without decomposing.

The biopolymer and isocyanate may be applied together, meaning that the biopolymer and second compound (if any) are mixed with the isocyanate before being applied on wood chips before they pass through a dryer for MDF, or at the resonator for particle board. The spraying may be done into a "blow line" for MDF where wood chips pass through at about 50% moisture. In the dryer, the wood chips are dried to about 12% water before being formed and pressed into boards. Alternatively, the biopolymer and isocyanate may be applied "back to back", meaning that the water, biopolymer and second compound (if any) are applied on wood chips before they pass through a dryer first and the isocyanate is separately applied on the wood chips but still before they pass through a dryer. In the lab scale examples described in detail herein the isocyanate is sprayed on the wood substrates after the water and biopolymer but in a commercial resinator the isocyanate and water/biopolymer mixtures may be sprayed on the wood strips generally simultaneously, i.e. from different nozzles into a common mixing chamber. In another alternative, the biopolymer and isocyanate may be applied "after dryer", which is like back to back but the isocyanate is applied on the wood chips after they pass through the dryer. The results are better in lab scale trials with a "together" application, but for some compounds that do not mix well, a "back to back" or "after dryer" application may be preferred, particularly in commercial resinators where better sprayers are used. "After dryer" application may be useful to avoid pMDI accumulation on metal surfaces before the dryer. The physical properties of the resulting board appear to be best when the biopolymer and isocyanate are applied together, but "back to back" and "after dryer" isocyanate application provides useful products. Without intending to be limited by theory, it is postulated that droplets (or other small volumes) containing isocyanate, water and biopolymer can form by contact between a droplet of water and biopolymer and a droplet comprising isocyanate either in the air (i.e. by collision of overlapping sprays) or on the wood substrate, with the water/biopolymer droplet possibly taking the form of a film wetting the wood substrate. The composition of a droplet formed by contact between a water/biopolymer droplet and an oily droplet comprising an isocyanate may be similar to the composition of a droplet formed by spraying an emulsion of an oil phase containing one or more isocyanates in an aqueous phase containing one or more biopolymers.

A binder may have various additives. Urea, mentioned above, is useful to reduce the viscosity of the binder, as a crosslinker and to scavenge formaldehyde released from the wood component. Although the binder preferably has no added formaldehyde, some formaldehyde occurs naturally in wood and composite products are often made from recycled wood products, which often contain formaldehyde. Other humectants, such as calcium chloride or glycerol, may also be added to lower viscosity of the binder. One or more release agents may be added, although less release agent is required than when using pMDI alone since the biopolymer-isocyanate mixtures demonstrate reduced plate and belt sticking. Silicone containing products may be added to increase water resistance of the finished product, and to act as a release agent.

The binders can be mixed in an in-line static mixer, for example of the type having a set of fins inside of a segment of tube. Two inlets are provided at the upstream end of the mixer. One inlet carries a mixture of water, biopolymer and any urea or other additives. The second inlet carries pMDI. Mixed binder is produced at the downstream end of the mixer. The downstream end of the mixer may be connected to a blowline or resonator, or other sprayer or addition system.

In an example of a mixing process, the biopolymer and urea, if any, are mixed into water under appropriate conditions. Cold soluble starch, for example, may be mixed at 200 rpm using a mechanical prop mixer under relatively low shear. Starch nanoparticles may be dispersed with relatively high shear. The agitation speed may be about 400 rpm while the isocyanate is added slowly. Once all of the isocyanate is added, mixing continues for about 5 minutes until a homogenous emulsion is observed. Optionally, the emulsion may be diluted by adding more water while maintaining 400 rpm (indirect dilution). In another option, the mixture of biopolymer and water may be diluted by adding water and isocyanate simultaneously (direct dilution). Direct and indirect dilution generally produce emulsions with similar viscosity.

pH of the emulsion is optionally neutral to basic, for example with a pH of 7 to 10. When biopolymer nanoparticles are used, a pH of about 8 assists with dispersing the nanoparticles. The emulsion may contain one or more additives such as a biocide, a pH modifier or an isocyanate curing catalyst.

A higher viscosity, for example between 1000 and 5000 cPs or between 1000 and 10,000 cPs is desirable for making composites with substrates in the form of sheets that are coated with a binder, for example wood veneers used to make plywood or other products. Higher viscosities can be achieved by choosing a biopolymer that tends to produce high viscosity such as defatted soy flour, a mixture of starch nanoparticles and defatted soy flour, degermed yellow corn meal or condensed distiller syrup. Alternatively, for other biopolymers, viscosity can be increased for example by using a high pMDI:Water phase ratio ($\beta$) or by exposing the mixture to high shear. For example, in trials where an emulsion was prepared using a shear pump for mixing, compositions containing water, PMDI and biopolymer nanoparticles made with a crosslinked blend of 75% waxy corn starch and 25% potato starch were able to achieve viscosities ranging from 1000 to 10,000 cPs at Beta values ranging from 0.8 to 1.3 using a very small (high shear) nozzle whereas viscosities under 500 cPs were achieved with the same biopolymer over the same Beta range when a nozzle was not added to the outlet of the shear pump.

Figure 1:
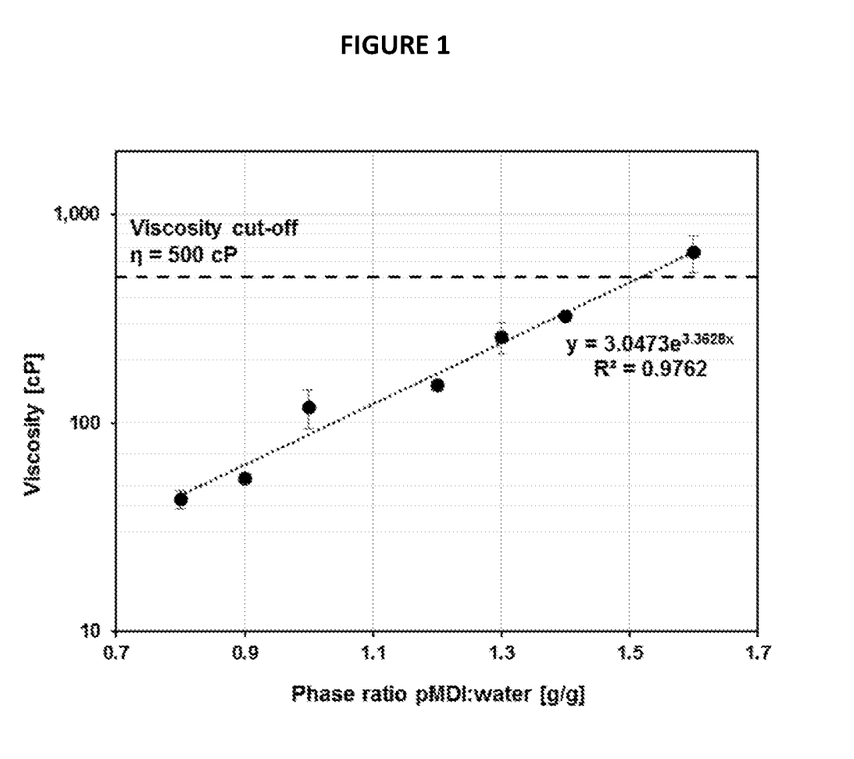
FIG. 1 is a graph showing the initial RVA viscosity-phase ratio relationship for an example of a pMDI ("oil") in water emulsion at 40° C. in the presence of biopolymer nanoparticles in the following weight ratio sample composition (Biopolymer:Urea:pMDI:Water)=(21:4:75:water varies).

FIG. 1 provides an example of the initial RVA viscosity-phase ratio relationship for pMDI ("oil") in water emulsions at 40° C. in the presence of starch nanoparticles in the following weight ratio sample composition (Biopolymer:Urea:pMDI:Water)=(21:4:75:water varies). To prepare the samples, a biopolymer dispersion containing urea was prepared using a mechanical prop mixer under relatively high shear. The required amount of this biopolymer dispersion was then added to an appropriate container for the RVA. The additional amounts of pMDI and water, if any, were added. The components were emulsified at 40° C. for 5 minutes at 500 rpm, followed by 5 minutes at 100 rpm. The viscosity reading was taken directly after the completion of the second 5 minutes of mixing.

The preferred window of operation, in relation to viscosity for sprayed applications, is enclosed by a viscosity cut-off of 500 cP and a maximum phase ratio of about 1.5. As FIG. 1 demonstrates, with the appropriate water to pMDI ratio, a binder with a 25:75 ratio of biopolymer to pMDI can have viscosity that meets requirements of an MDF or particle board process. Acceptable viscosity can be produced when the weight of pMDI is not more than 150%, or preferably not more than 130% or 110% of the weight of water, and when the combined weight of biopolymer and pMDI is not more than 200% of the weight of water. However, as will be discussed below, the emulsion can be prepared at a pMDI:Water phase ratio of over 1.5 and then diluted to a phase ratio of 1.5 or less for application to wood. Such dilution can produce a more stable emulsion.

Figure 2:
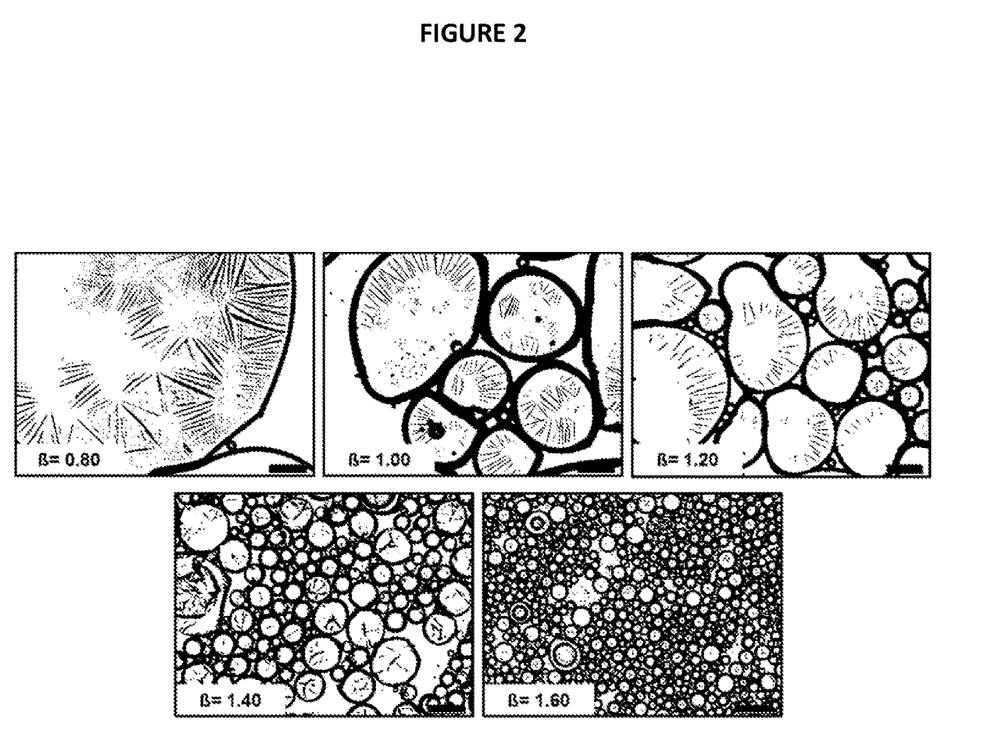
FIG. 2: Light microscopy images of pMDI in water emulsions at different pMDI:Water phase ratios (β) in the presence of biopolymer nanoparticles in the following weight ratio sample composition (Biopolymer:Urea:pMDI:Water)=(21:4:75:water varies). Scale bar in all images equals 100 μm.

FIG. 2 illustrates light microscopy images of pMDI in water emulsions at different pMDI:Water phase ratios ($\beta$) in the presence of starch nanoparticles in the following weight ratio sample composition (Biopolymer:Urea:pMDI:Water)= (21:4:75:water varies). FIG. 2 demonstrates that at a ratio of $\beta=1.6$ more consistent and smaller droplet sizes are created. Smaller droplets have been found to result in emulsions that are stable for a longer time period. In contrast, at $\beta=0.8$ much larger, less consistent and less stable droplets are formed. Although these emulsions at $\beta=0.8$ or less may have a viscosity below 500 cP for 30 minutes of more under constant mixing, there is macroscopic phase separation of these larger droplet emulsions on the time scale of a few minutes once agitation is stopped. Although these emulsions may be used if applied immediately after mixing, emulsions made with $\beta=0.8$ are more stable and more suitable for particle board and MDF processing.

Figure 3:
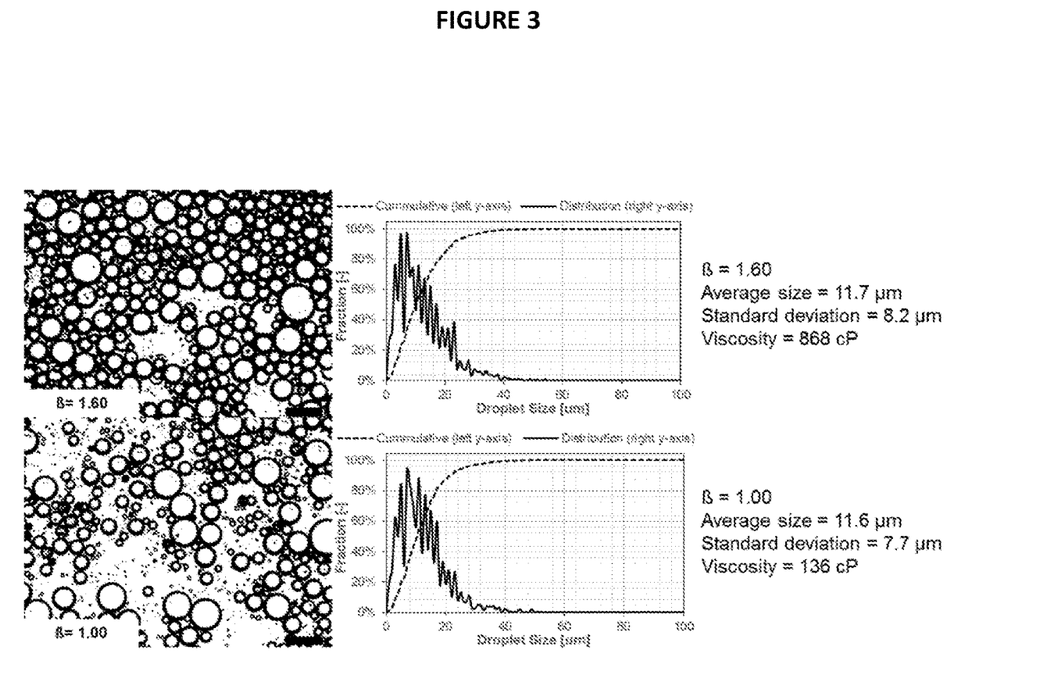
FIG. 3: Light microscopy images and droplet size data for an emulsion created at a pMDI:Water phase ratio of 1.60 and later diluted to a phase ratio of 1.00, indicating that the viscosity of the emulsion can be further reduced by dilution without material reduction in the particle size. Scale bar indicates 100 μm.

In FIG. 3, a starch nanoparticle dispersion was prepared using a mechanical prop mixer under relatively high shear. The agitation speed was increased to 400 rpm and pMDI was added slowly. Once all of the pMDI had been added to achieve a pMDI:Water phase ratio of 1.6, mixing was continued for 5 min until a homogenous emulsion was observed. The pMDI in water emulsion was then further diluted to a phase ratio of 1.0 by adding the required amount of water to the emulsion while maintaining 400 rpm for 5 minutes. The Brookfield viscosity of the samples before and after addition of the water was measured using spindle #4 at 100 rpm and at room temperature.

FIG. 3 illustrates light microscopy images and image analysis results indicating that the emulsion with pMDI added to a phase ratio of 1.6 has a relatively small and consistent droplet size. This emulsion is stable and does not phase separate even when left standing for extended periods of time without mixing. While the viscosity of the emulsion at this phase ratio would be too high, the viscosity was reduced by dilution to a phase ratio of 1.0 to meet the requirements of an MDF or particle board making process. Of note, the particle size did not materially change during the dilution indicated that, during the 5 minutes of mixing after the pMDI was added, a stable shell (as visible in FIGS. 2 and 3) had already formed around the isocyanate droplets. Dilution to a phase ratio of 1.0 produced a viscosity comparable to an emulsion produced by adding pMDI to an equal weight of water as recorded in FIG. 1. However, the average droplet size of 11.6 microns for the emulsion diluted to a phase ratio of 1.0 is at least an order of magnitude less than the droplet size that is produced when an emulsion is originally created at a phase ratio of 1.0. Further, the emulsion diluted to a phase ratio of 1.0 is stable even when left without stirring. In contrast, emulsions initially made at a phase ratio of 1.0 are less stable and will phase separate if left un-stirred. Thus viscosity is related to phase ratio at the time of the viscosity measurement, but droplet size and un-stirred stability are related to the phase ratio that was present when the pMDI was first added to the biopolymer in water dispersion. The droplet size and un-stirred stability are related to the initial phase ratio that was present when the pMDI was first added to the biopolymer in water dispersion, the viscosity can be independently controlled through dilution of the emulsion. The smaller droplets are apparently more stable. Accordingly, it is preferred to make emulsions with a phase ratio of more than 0.8, preferably 1.0 or more, and to dilute the initial emulsion if a lower viscosity or lower solids content is desired. While emulsions that are remain homogenous only during or directly after mixing are useful, more stable emulsions are preferred. The average isocyanate droplet size in an emulsion is preferably 500 microns or less, 250 microns or less, or 100 microns or less.

Figure 4:
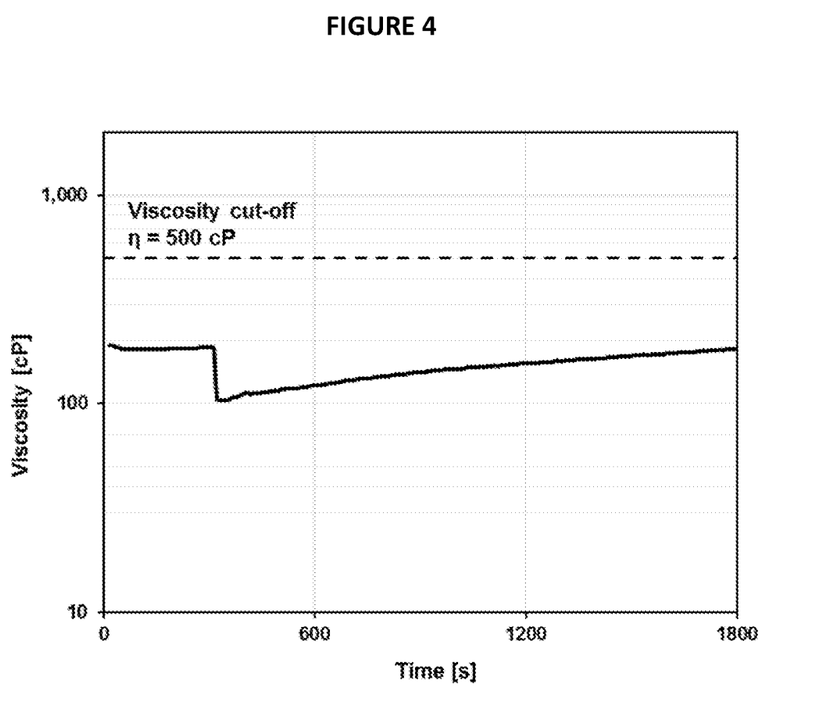
FIG. 4: Evolution of RVA viscosity over time at 40° C. for pMDI in water emulsions in the presence of biopolymer nanoparticles in the following weight ratio sample composition (Biopolymer:Urea:pMDI:Water)=(21:4:75:75). Viscosity measured in a rapid visco analyzer at 100 rpm.

FIG. 4 shows the evolution of RVA viscosity over time at 40° C. for a pMDI in water emulsion over a 30 minute time period in the presence of biopolymer nanoparticles in the following weight ratio sample composition (Biopolymer:Urea:pMDI:Water)=(21:4:75:75). The viscosity was measured in a rapid visco analyzer at 100 rpm, and indicates a stable emulsion within the target viscosity range.

EXAMPLES

I. Biopolymer Samples

Various different biopolymer samples used in making binders are described in Table 1 below. In the case of biopolymer nanoparticles, these were made by reactive extrusion generally as described in International Publication Number WO 2008/022127 (see Table 1).

TABLE 1

Summary of Biopolymer Samples

| | |
|---|---|
| Nanoparticle A | Commercial ECOSPHERE 2202 biopolymer nanoparticles by EcoSynthetix (crosslinked waxy corn starch nanoparticles extruded with 0 parts urea per 100 parts starch) |
| Nanoparticle B | biopolymer nanoparticles made of waxy corn starch extruded with 10 parts urea per 100 parts starch |
| Nanoparticle C | biopolymer nanoparticles made of 75% waxy corn starch and 25% potato starch extruded with 10-18 parts urea per 100 parts starch |
| Nanoparticle D | biopolymer nanoparticles made of 25% potato starch and 75% waxy corn starch extruded with a crosslinker and 0 parts urea per 100 parts starch |
| Nanoparticle E | biopolymer nanoparticles made of waxy corn starch extruded with 10 parts melamine and 5 parts citric acid per 100 parts starch |
| Cold soluble starch | C*iCoat ™ produced by Cargill |
| Cooked cold soluble starch | Cooked C*iCoat ™ produced by Cargill |
| Extruded starch | Waxy corn starch converted into a thermoplastic melt phase in an extruder |
| Defatted soy flour | PROLIA FLR-200/90 |
| Condensed distiller syrup | |
| Nanoparticle F | Biopolymer nanoparticles made of degermed yellow corn meal |
| Biopolymer mixture | 50:50 mixture of Nanoparticle D and defatted soy flour |

II. Viscosity of Biopolymer Dispersions

Samples of biopolymers were dispersed in water at 30 wt % solids, except defatted soy flour which was dispersed at 24.9% solids, using a small amount of sodium carbonate or sodium hydroxide to adjust the pH to about 8, and secondly 5 wt % urea was dissolved to obtain 35% solids dispersions. The viscosity of the samples was measured at room temperature (RT) using a DVII Brookfield Viscometer (spindle #5 at 200 rpm). The results of the viscosity measurements are provided in Table 2.

TABLE 2

Viscosity of Biopolymer Dispersions

| Biopolymer Sample | Viscosity (cP) Without Urea | Viscosity (cP) With Urea |
|---|---|---|
| Nanoparticle D | 504 | 276 |
| Nanoparticle A | 776 | 280 |
| cold soluble starch | 800 | 528 |
| cooked cold soluble starch | 244 | 196 |
| extruded starch | 4160 | 2600 |
| defatted soy flour | 5000 | N/A |
| condensed distiller syrup | 670 | 640 |
| Nanoparticle F | 3330 | 2560 |
| Nanoparticle C | 494 | 178 |

As indicated in Table 2, urea had the effect of substantially reducing the viscosity of all of the biopolymer dispersions. Further, the biopolymer can be selected to produce a viscosity that is suitable for either spraying or coating application.

III. Viscosity of Biopolymer/pMDI Dispersions

Samples of biopolymers, pMDI, urea (in some samples) and water were prepared using the weights of each constituent given in Tables 3 to 7. The samples also contain a small amount of sodium carbonate or sodium hydroxide to adjust the pH to about 8 and biocide at up to 0.1% of the total solids. The biopolymer and urea, if any, were first mixed into the water at 200 rpm using a mechanical prop mixer under relatively low shear. Mixing continued at 200 rpm while the pMDI was added slowly. Once all of the pMDI had been added, the mixing speed was increased up to 700 rpm until a homogenous emulsion was observed. The Brookfield viscosity of the samples was measured under similar conditions as listed above. In addition, the viscosity of some samples was also measured using a rapid visco analyzer (RVA) maintained under isothermal conditions at 40° C. Stirring in the RVA for the first 5 minutes was at 500 rpm followed by stirring at 100 rpm for a further 25 minutes to make up the 30 minute time noted in the Tables. The results of the viscosity measurements are provided in Tables 3-7. The designation "N/A" in the following tables indicates that a particular measurement of a particular sample was not carried out, while designation "Gel" indicates the viscosity was too high to measure.

TABLE 3

Viscosity of Nanoparticle D and pMDI Dispersions

| Sample Composition (Biopolymer:Urea:pMDI:Water) (g) | Initial Brookfield Viscosity (cP) at RT | Brookfield Viscosity (cP) after 30 minutes at RT | Brookfield Viscosity (cP) after 120 minutes at RT | RVA Viscosity (cP) after 30 minutes at 40° C. |
|---|---|---|---|---|
| 25:0:75:45 | 3800 | 4900 | 18000 | N/A |
| 21:4:75:45 | 2300 | 3300 | 8500 | 1424 |
| 37:0:75:73 | 2200 | 3850 | 11800 | N/A |
| 31:6:75:73 | 1700 | 2200 | 4200 | 624 |
| 75:0:75:136 | 1248 | 1800 | 3000 | N/A |
| 63:12:75:136 | 820 | 1040 | 1200 | 362 |

TABLE 4

Viscosity of Nanoparticle A and pMDI Dispersions

| Sample Composition (Biopolymer:Urea:pMDI:Water) (g) | Initial Brookfield Viscosity (cP) at RT | Brookfield Viscosity (cP) after 30 minutes at RT | Brookfield Viscosity (cP) after 120 minutes at RT |
|---|---|---|---|
| 25:0:75:45 | 5840 | 13600 | Gel |
| 21:4:75:45 | 3650 | 5880 | Gel |
| 37:0:75:73 | 3268 | 52100 | 37480 |
| 31:6:75:73 | 1422 | 1888 | 7390 |
| 75:0:75:136 | 1508 | 2096 | 8160 |
| 63:12:75:136 | 736 | 836 | 1280 |

TABLE 5

Viscosity of cold soluble starch and pMDI Dispersions

| Sample Composition (Biopolymer:Urea:pMDI:Water) (g) | Initial Brookfield Viscosity (cP) at RT | Brookfield Viscosity (cP) after 30 minutes at RT | Brookfield Viscosity (cP) after 120 minutes at RT |
|---|---|---|---|
| 25:0:75:45 | 4300 | 13860 | Gel |
| 21:4:75:45 | 5230 | 14240 | Gel |
| 37:0:75:73 | 3050 | 12180 | Gel |
| 31:6:75:73 | 2980 | 19920 | Gel |
| 75:0:75:136 | 3120 | 26160 | Gel |
| 63:12:75:136 | 1756 | 16040 | Gel |

TABLE 6

Viscosity of cooked cold soluble starch and pMDI Dispersions

| Sample Composition (Biopolymer:Urea:pMDI:Water) (g) | Initial Brookfield Viscosity (cP) at RT | Brookfield Viscosity (cP) after 30 minutes at RT | Brookfield Viscosity (cP) after 120 minutes at RT |
|---|---|---|---|
| 25:0:75:45 | 1352 | 2172 | 5380 |
| 21:4:75:45 | 756 | 1236 | 2260 |
| 37:0:75:73 | N/A | N/A | N/A |
| 31:6:75:73 | N/A | N/A | N/A |

TABLE 6-continued

Viscosity of cooked cold soluble starch and pMDI Dispersions

| Sample Composition (Biopolymer:Urea:pMDI:Water) (g) | Initial Brookfield Viscosity (cP) at RT | Brookfield Viscosity (cP) after 30 minutes at RT | Brookfield Viscosity (cP) after 120 minutes at RT |
|---|---|---|---|
| 75:0:75:136 | 420 | 472 | 632 |
| 63:12:75:136 | 338 | 398 | 600 |

TABLE 7

Viscosity of extruded starch and pMDI Dispersions

| Sample Composition (Biopolymer:Urea:pMDI:Water) (g) | Initial Brookfield Viscosity (cP) at RT | Brookfield Viscosity (cP) after 30 minutes at RT | Brookfield Viscosity (cP) after 120 minutes at RT |
|---|---|---|---|
| 25:0:75:45 | 2060 | 3520 | 7120 |
| 21:4:75:45 | 1880 | 3280 | 6160 |
| 37:0:75:73 | N/A | N/A | N/A |
| 31:6:75:73 | N/A | N/A | N/A |
| 75:0:75:136 | 13040 | 39900 | N/A |
| 63:12:75:136 | 8210 | 39200 | N/A |

As indicated in Tables 3-7, binders using Nanoparticle D, Nanoparticle A and cooked cold soluble starch were produced having a viscosity of about 1000 cP or less at room temperature. These viscosities remained below about 1000 cP for at least 30 minutes. Given the results above for Brookfield viscosity at room temperature (RT) and RVA viscosity at 40° C. it can be concluded that the lower viscosity results for some of the formulations described can meet the viscosity requirements of an MDF or particle board process.

IV. Production of Particle Board in the Laboratory

Particle board samples at 18 mm thickness were produced as described in Table 8 at 3% overall binder loading. All test procedures are as documented in ASTM D1037-12. All dispersions were made at 35% solids including 30% biopolymer and 5% urea. As the data in Table 8 demonstrate, board properties are comparable for all formulations for each substitution level.

V. Curing Profiles of Biopolymer/pMDI Dispersions

Binders were prepared using 30% Nanoparticle D plus 5% urea and two types of pMDI labeled here as A (supplied by BASF) and B (MS300 supplied by Elastochem) at two weight ratios. Onset, peak and endset curing temperatures were determined by differential scanning calorimetry (DSC). The results are given in Table 9 below. All samples indicated curing profiles suitable for use with existing wood composite manufacturing processes.

TABLE 9

| | Curing Temperature | | |
|---|---|---|---|
| Binder Composition | Curing Onset Temperature (° C.) | Curing Peak Temperature (° C.) | Curing Endset Temperature (° C.) |
| Biopolymer 25 pMDI A 75 | 104 | 122 | 134 |
| Biopolymer 50 pMDI A 50 | 100 | 116 | 130 |
| Biopolymer 25 pMDI B 75 | 109 | 120 | 132 |
| Biopolymer 50 pMDI B 50 | 94 | 118 | 130 |

VI. Industrial Scale Production of MDF

A binder was prepared having the following constituents: 25% of Nanoparticle D/urea at an 85/15 ratio dispersed in water at a 35% total solids and 75% pMDI sprayed separately.

Samples of 8 mm thick MDF flooring were made using a) pMDI applied at 2.7% of the weight of wood and b) the pMDI/Nanoparticle D mixture described above applied at 2.7% of the weight of the wood based on the solids in the mixture only. Results of tests on the samples are given below in Table 10. As indicated, samples prepared with a 25% (1:3) replacement of pMDI with Nanoparticle D had performance comparable to samples produced with pMDI alone.

TABLE 8

Comparison of the properties for lab-produced particle board using different biopolymers and pMDI

| | Nanoparticle D/pMDI 50:50 | Nanoparticle A/pMDI 50:50 | Cooked cold soluble starch/pMDI 50:50 | Nanoparticle D/pMDI 25:75 | Nanoparticle A/pMDI 25:75 | Cooked cold soluble starch/pMDI 25:75 | pMDI |
|---|---|---|---|---|---|---|---|
| Swelling 2 h (%) | 8.6 | 9.4 | 8.8 | 7.5 | 12.8 | 8.5 | 5.5 |
| Swelling 24 h (%) | 42.6 | 42.8 | 45.4 | 30.0 | 38.3 | 35.1 | 20.3 |
| WA 2 h (%) | 37.1 | 52.3 | 44.2 | 33.3 | 58.7 | 47.6 | 27.9 |
| WA 24 h (%) | 111.6 | 122.6 | 123.1 | 89.9 | 115.8 | 106.8 | 67.5 |
| MOR (MPa) | 7.1 | 6.5 | 6.5 | 8.0 | 6.8 | 7.3 | 9.0 |
| MOE (MPa) | 1236 | 1064 | 1165 | 1338 | 1149 | 1276 | 1404 |

TABLE 10

Comparison of the properties for industrially-produced
MDF board using Nanoparticle D and pMDI

|  | pMDI | 1:3 Nanoparticle D:pMDI |
|---|---|---|
| Density | 846 | 834 |
| MOR (N/mm$^2$) | 42.5 | 41.7 |
| IB (N/mm$^2$) | 2.5 | 2.3 |
| 2 h TS | 12.4 | 10.7 |
| 24 h TS | 22.3 | 22.3 |
| 2 h WA | 19.2 | 18.0 |
| 24 h WA | 34.3 | 25.2 |

VII. Production of Particle Board in the Laboratory Using Different Biopolymers

Particle board samples at 18 mm thickness were produced as described in Table 11 at 5% overall binder loadings. All test procedures are as documented in ASTM D1037-12. All dispersions were made at 35% solids using different biopolymers as described in Table 1. As the data in Table 11 demonstrate, board properties can vary for different formulations. The results demonstrate that Nanoparticle A resulted in the best board performance as compared to UF control board. As is common practice in the industry, the % solid binder loading=g of binder per 100 g dry wood

TABLE 11

Comparison of the properties for lab-produced particle board using different
biopolymers and pMDI

|  | UF (10%) | Nanoparticle A (4%), MS300 (1%) | Nanoparticle B (4%), MS300 (1%) | Nanoparticle C (4%), MS300 (1%) | Nanoparticle D (4%), MS300 (1%) | Nanoparticle E (4%), MS300 (1%) |
|---|---|---|---|---|---|---|
| Swelling 2 h (%) | 24.5 | 17.8 | 32.1 | 30.3 | 16.9 | 13.3 |
| Swelling 24 h (%) | 54.9 | 59.6 | 75.0 | 73.4 | 68.3 | 64.0 |
| Average MOR (MPa) | 11.1 | 15.3 | 12.3 | 11.7 | 15.4 | 12.8 |
| Average MOE (MPa) | 2643 | 2670 | 2108 | 2097 | 2564 | 2338 |

VIII Alternative Addition Methods

All testing in this example is as per ASTM D1037-12. The label "Together" indicates the biopolymer and isocyanate were mixed together and sprayed on the wood as a mixture before the dryer. Back to back indicates that the biopolymer dispersion was sprayed first and the pMDI was sprayed one minute later, but both before the dryer. After dryer indicates that the biopolymer dispersion was sprayed before the dryer and the pMDI was sprayed after the dryer. The biopolymer was Nanoparticle D with urea in an 85:15 mass ratio. The pMDI control was applied at 3% (3 g pMDI per 100 g wood). In the "pMDI/biopolymer Together", "pMDI/biopolymer Back to Back" and "pMDI/biopolymer After Dryer" trials, a mixture of Nanoparticle D with urea in an 85:15 mass ratio was applied at 1.5% and pMDI was applied at 1.5%. The results are provided in Table 12 below.

TABLE 12

Comparison of the properties for lab-produced
particle board using different addition methods

|  | pMDI (3%) | pMDI/Nanoparticle Together (3%) | pMDI/Nanoparticle Back to Back (3%) | pMDI/Nanoparticle After Dryer (3%) |
|---|---|---|---|---|
| IB (MPa) | 0.74 | 0.81 | 0.49 | 0.69 |
| Swelling 2 h (%) | 8.0 | 8.2 | 12.1 | 9.5 |
| Swelling 24 h (%) | 30.1 | 36.0 | 62.7 | 47.4 |
| MOR (MPa) | 13.9 | 15.8 | 11.4 | 14.6 |
| MOE (MPa) | 1987 | 2154 | 1846 | 2135 |

As indicated in Table 12, the Together application method demonstrates comparable performance to control pMDI. The Back to Back application resulted in board properties that were significantly worse than application together or after the dryer. After Dryer application showed better results, but still without producing results comparable to pMDI.

IX. Production of Particle Board

Particle board samples at 10 mm thickness were produced as described in Table 13 at 3% overall binder loading. All test procedures are as documented in ASTM D1037-12. Dispersions of biopolymer (Nanoparticle D with urea in an 85:15 mass ratio) were made at initially higher solids contents and diluted down to 25% and 30% total solids after the pMDI was added. As the data in Table 13 demonstrate, board properties are comparable for formulations that were diluted to obtain lower RVA viscosity (below 300 cps) down to 25%, and further that 30% solids shows better results between the two final solids concentrations tested.

TABLE 13

Comparison of the properties for lab-produced particle board using different solids levels

| Description | pMDI | pMDI 25% substitution, 30% solids biopolymer | pMDI 25% substitution, 25% solids biopolymer | pMDI 35% substitution, 30% solids biopolymer | pMDI 35% substitution, 25% solids biopolymer | pMDI 50% substitution, 25% solids biopolymer |
|---|---|---|---|---|---|---|
| IB Average (MPa) | 0.94 | 0.93 | 0.87 | 0.86 | 0.80 | 0.77 |
| IB Std Deviation | 0.10 | 0.06 | 0.10 | 0.06 | 0.07 | 0.08 |
| Density Average (Kg/m$^3$) | 670 | 674 | 672 | 682 | 671 | 676 |
| Density Std Deviation | 24 | 18 | 16 | 24 | 23 | 38 |
| 2 h TS Average (%) | 35.91 | 40.28 | 38.97 | 43.42 | 42.59 | 48.46 |
| 2 h TS Std Deviation | 1.91 | 2.00 | 3.03 | 1.75 | 2.19 | 3.59 |
| Density Average (Kg/m$^3$) | 686 | 683 | 686 | 678 | 680 | 687 |
| Density Std Deviation | 15 | 26 | 23 | 21 | 14 | 34 |
| 24 h TS Average (%) | 37.5 | 41.6 | 38.2 | 45.1 | 45.4 | 52.2 |
| 24 h TS Std Deviation | 1.6 | 2.4 | 1.9 | 1.9 | 1.9 | 3.6 |
| 2 h WA Average (%) | 80.0 | 85.9 | 84.7 | 92.8 | 92.6 | 95.3 |
| 2 h WA Std Deviation | 2.3 | 2.7 | 3.6 | 3.8 | 2.7 | 3.5 |
| 24 h WA Average (%) | 91.4 | 94.9 | 92.5 | 99.6 | 99.9 | 102.5 |
| 24 h WA Std Deviation | 2.5 | 2.7 | 3.3 | 3.0 | 2.2 | 2.7 |
| Average MOR (MPa) | 16.81 | 15.70 | 15.07 | 14.65 | 15.89 | 15.56 |
| Average MOE (MPa) | 2316 | 2241 | 2126 | 2211 | 2244 | 2223 |
| Thickness (mm) | 9.96 | 10.01 | 10.01 | 10.03 | 9.95 | 9.98 |

We claim:

1. A composite material comprising wood, one or more biopolymers and one or more isocyanates, wherein the one or more biopolymers and one or more isocyanates have a weight between 2% and 8% of the weight of the wood, wherein the one or more biopolymers comprises starch nanoparticles.

2. The composite material of claim 1 selected from the group consisting of particleboard and fiberboard.

3. The composite material of claim 1 wherein the one or more biopolymers comprises an amylaceous material, a proteinaceous material or both.

4. The composite material of claim 1 wherein a ratio by weight of the one or more biopolymers to the one or more isocyanates is in the range of 80:20 to 15:85.

5. The composite material of claim 1 wherein a ratio by weight of the one or more biopolymers to the one or more isocyanates is in the range of 50:50 to 15:85.

6. The composite material of claim 1 wherein at least 50% by weight of the one or more biopolymers is starch nanoparticles.

7. The composite material of claim 6 wherein the one or more biopolymers comprises a) waxy corn starch or a derivative thereof and b) potato starch or a derivative thereof.

8. The composite material of claim 1 further comprising a catalyst.

9. The composite material of claim 1 further comprising urea.

10. The composite material of claim 1 further comprising a humectant.

11. The composite material of claim 10 wherein the humectant is glycerol.

* * * * *